(12) United States Patent
Tajima et al.

(10) Patent No.: US 7,750,529 B2
(45) Date of Patent: Jul. 6, 2010

(54) ELECTRIC PUMP

(75) Inventors: Fumio Tajima, Hitachi (JP); Masashi Kitamura, Mito (JP); Yuji Enomoto, Hitachi (JP); Yuji Nomoto, Atsugi (JP); Kenya Takarai, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/779,516

(22) Filed: Jul. 18, 2007

(65) Prior Publication Data

US 2008/0019850 A1 Jan. 24, 2008

(30) Foreign Application Priority Data

Jul. 21, 2006 (JP) .............................. 2006-198875

(51) Int. Cl.
*H02K 37/12* (2006.01)
*H02K 37/14* (2006.01)
*H02K 1/17* (2006.01)
*F04D 13/06* (2006.01)

(52) U.S. Cl. .................... 310/257; 310/49 A; 417/423.8

(58) Field of Classification Search .................... 310/43, 310/45, 49 A, 49.15, 216.066–216.067, 216.112, 310/257; 417/426.1, 426.7, 423.8, 423.14
See application file for complete search history.

(56) References Cited

U.S. PATENT DOCUMENTS

| 4,695,419 | A | * | 9/1987 | Inariba .......................... 264/259 |
| 5,325,003 | A | * | 6/1994 | Saval et al. .................... 310/43 |
| 5,610,462 | A | * | 3/1997 | Takahashi ..................... 310/90 |
| 5,704,717 | A | * | 1/1998 | Cochimin ..................... 384/215 |
| 5,785,013 | A | * | 7/1998 | Sinn et al. ................. 123/41.44 |
| 6,153,953 | A | * | 11/2000 | Isozaki et al. ......... 310/216.112 |
| 6,201,324 | B1 | * | 3/2001 | Suzuki et al. .................. 310/57 |
| 6,506,034 | B1 | * | 1/2003 | Lentz et al. .............. 417/423.8 |
| 6,663,362 | B1 | * | 12/2003 | Lentz et al. .............. 417/423.7 |
| 6,939,115 | B2 | * | 9/2005 | Knoll et al. ............. 417/423.12 |
| 2002/0190585 | A1 | | 12/2002 | Sakamoto |
| 2005/0023905 | A1 | | 2/2005 | Sakamoto |

FOREIGN PATENT DOCUMENTS

| CN | 2086016 U | 10/1991 |
| CN | 1338032 A | 2/2002 |
| DE | 44 27 337 A1 | 2/1996 |
| DE | 199 56 380 C1 | 1/2001 |
| DE | 199 34 382 A1 | 2/2001 |

(Continued)

OTHER PUBLICATIONS

Japanese Office Action dated Dec. 24, 2008 with English translation (Seven (7) pages).

(Continued)

*Primary Examiner*—Tran N Nguyen
(74) *Attorney, Agent, or Firm*—Crowell & Moring LLP

(57) ABSTRACT

A pump is driven by a compact electric motor in which a coil is disposed in a ring form around and along a stator core which has a plurality of claw magnetic poles that extend alternately from both ends of one member of the stator core toward the end of the other member thereof. A stator core can be made from a compressed powder core by molding with resin, with the molded portion able to serve as a partition separating pump and motor units.

23 Claims, 10 Drawing Sheets

FOREIGN PATENT DOCUMENTS

| | | |
|---|---|---|
| EP | 0 977 339 A2 | 2/2000 |
| EP | 1 271 753 A2 | 1/2003 |
| JP | 2000-213490 A | 8/2000 |
| JP | 2003-505648 A | 2/2003 |
| JP | 2003-515059 A | 4/2003 |
| JP | 2004-248363 A | 9/2004 |
| JP | 2005-45890 A | 2/2005 |
| JP | 2006-14436 A | 1/2006 |

OTHER PUBLICATIONS

Chinese Office Action dated Aug. 15, 2008 with English translation (Nine (9) pages).

European Search Report dated Nov. 7, 2007 (Eight (8) Pages).

* cited by examiner

FIG. 5A
FIG. 5B
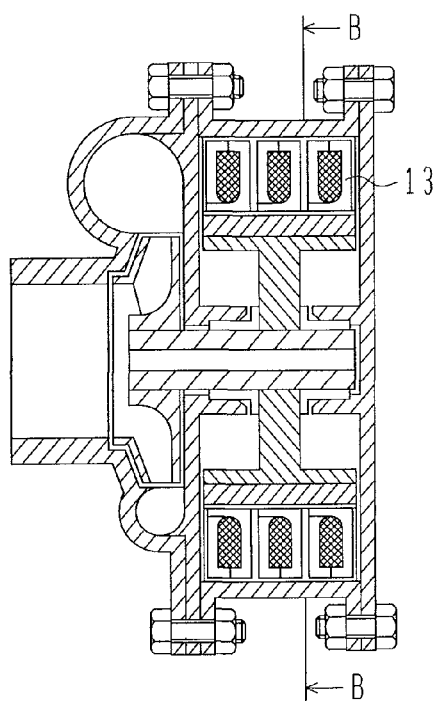
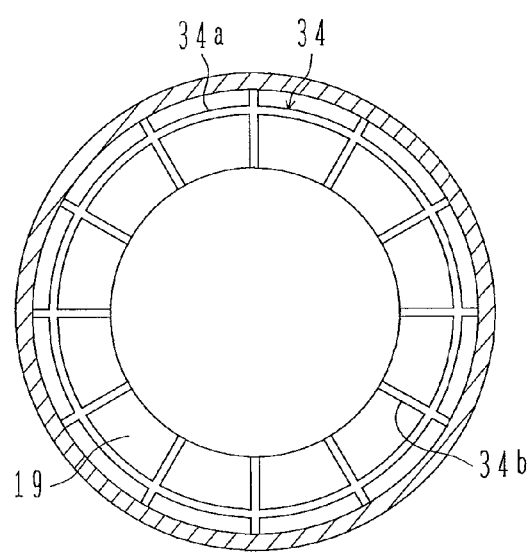
FIG. 5C
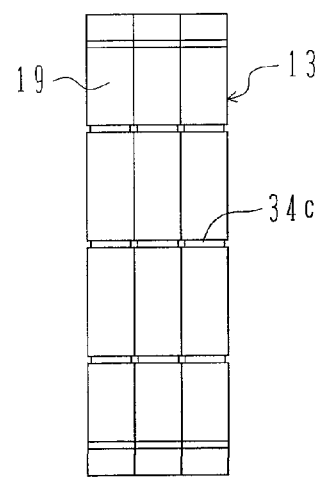

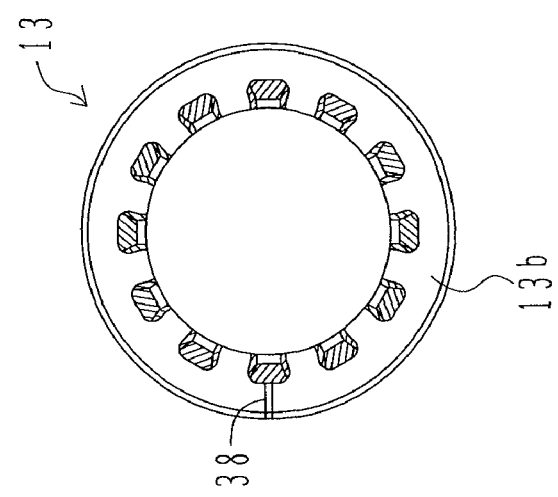
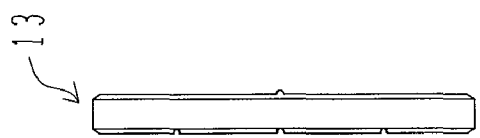
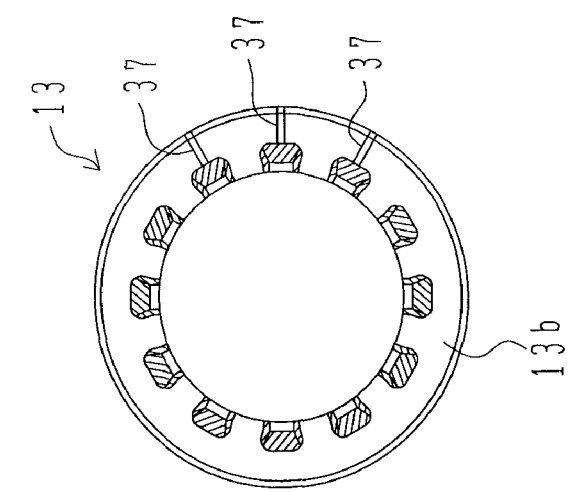

ELECTRIC PUMP

BACKGROUND OF THE INVENTION

1. Field of the Invention

The present invention relates to an electric pump driven by an electric motor.

2. Description of the Related Art

Among measures to improve automobile fuel efficiency are firstly idling stop adapted to stop an engine when a vehicle stops, and secondly hybridization adapted to drive a vehicle using a rotary electric machine and an engine. These measures have already found commercial use. To use these systems, a drive source is additionally required for a pump in the case of an idling stop system because the engine stops when the vehicle stops. In the case of hybrid vehicles, on the other hand, a water pump is required to cool the drive motor or starter-generator and its controller in addition to the idling stop system. As a result, an electric pump using an electric motor is increasingly common as a drive source.

JP-A-2000-213490 discloses an electric motor adapted to discharge cooling water by use of centrifugal force generated by rotating the impeller with the output shaft of the electric motor.

SUMMARY OF THE INVENTION

The electric motor adapted to drive the water pump described in JP-A-2000-213490 has a coil wound around the stator core so that the coil reciprocates along the drive shaft. As a result, the portions called the coil ends which do not contribute to generation of a stator torque protrude at both ends of the stator core. This makes it impossible to reduce the axial length of the pump. As a consequence, the pump is large as a whole, resulting in poor mountability.

It is an object of the present invention to provide a compact electric pump with high mountability.

The present invention is characterized in that a pump structural body is driven by an electric motor. The electric motor has a core with a plurality of first claw magnetic poles and a plurality of second claw magnetic poles, each extending from both axial ends of one member of the core toward the end of the other member of the core. The plurality of first claw magnetic poles and the plurality of second claw magnetic poles are formed alternatively in the circumferential direction of the core. A coil is wound around and along the core in a ring form.

The present invention is further characterized in that a pump structural body is provided adjacent to at least one end of the stator core and a magnetic pole member to discharge a cooling medium.

The present invention is still further characterized in that a pump structural body adapted to discharge a liquid is driven by an electric motor. The electric motor includes a molded portion, which is formed by molding of a non-magnetic material, at least on the inner periphery of the stator core which includes a compressed powder magnetic core.

The present invention makes it possible to reduce the size of an electric motor as a whole because of absence of coil ends, thus providing significantly improved mountability.

BRIEF DESCRIPTION OF THE DRAWINGS

FIGS. 5A to 5C illustrate the electric water pump of a second embodiment;

FIGS. 11A to 11D are views describing in detail the stator core of the fourth embodiment of the present invention.

DETAILED DESCRIPTION OF THE PREFERRED EMBODIMENTS

Embodiments of an electric water pump of the present invention will be described with reference to the accompanying drawings.

First Embodiment

Figure 1:
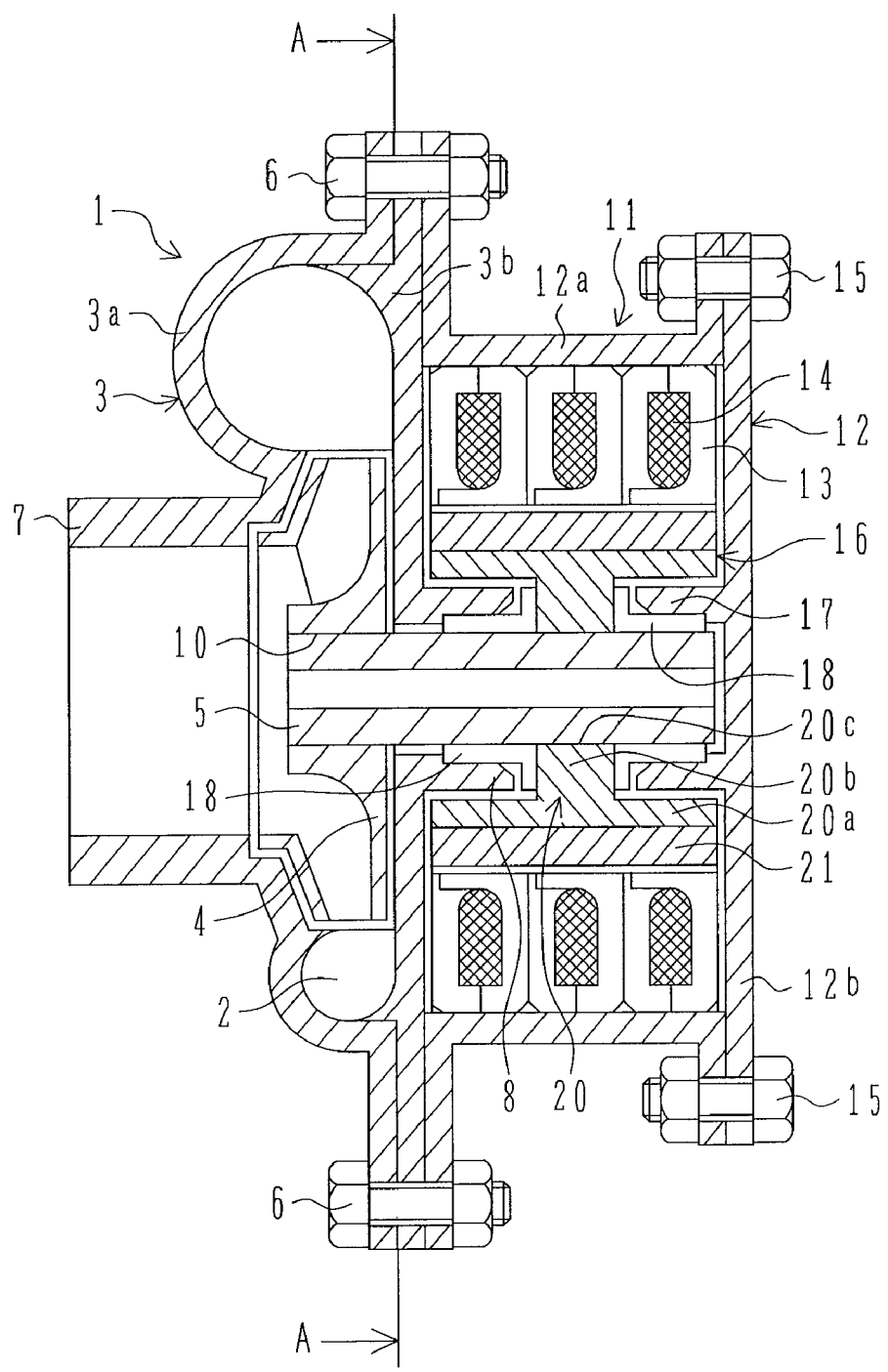
FIG. 1 is a sectional view of the axial side surface of an electric water pump according to a first embodiment of the present invention.
Figure 2A:
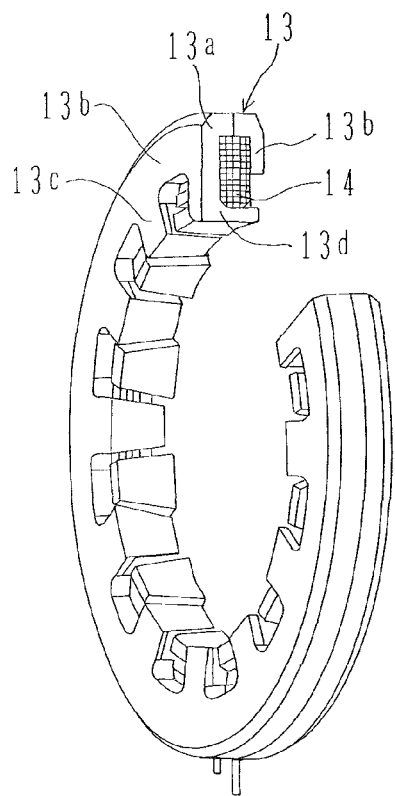
FIGS. 2A to 2D are views describing in detail a stator core for one phase and a coil according the first embodiment of the present invention.
Figure 2B:
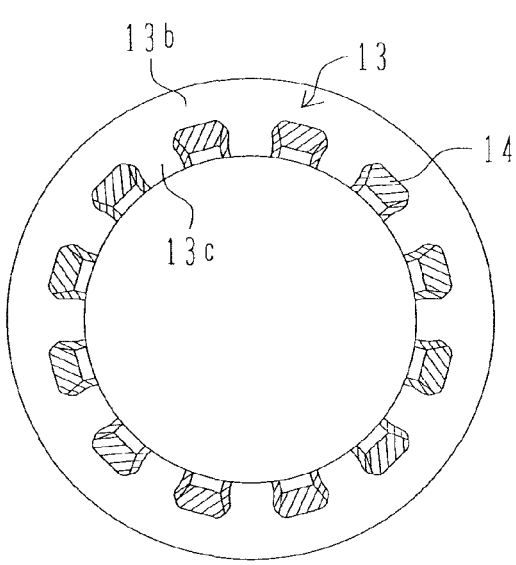
Figure 2C:
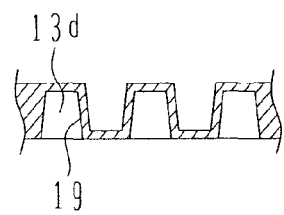
Figure 2D:
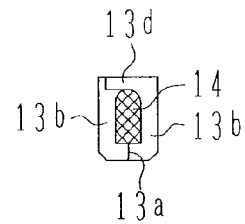
Figure 3:
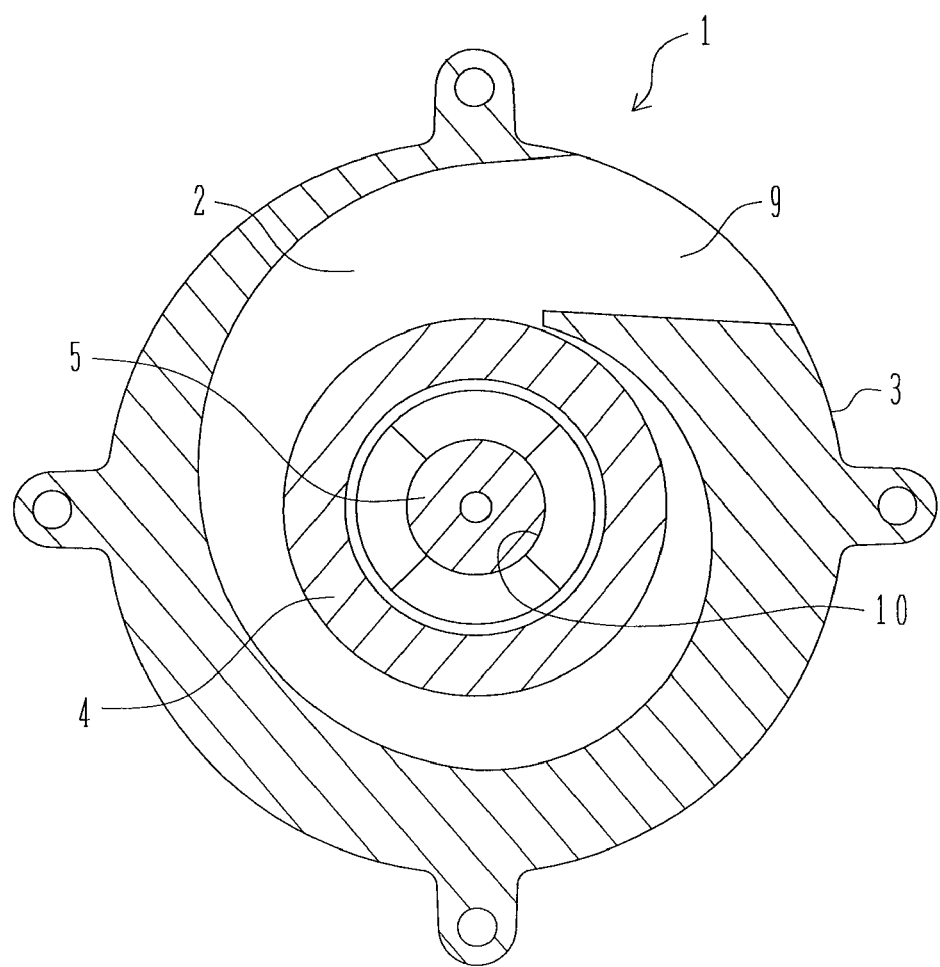
FIG. 3 is a sectional view along line A-A of the FIG. 1.

FIGS. 1 to 3 illustrate an electric motor of a first embodiment. FIG. 1 is a sectional view of the axial side surface of the electric water pump of the first embodiment. FIGS. 2A to 2D are views describing in detail a stator core for one phase and a coil of the first embodiment. FIG. 2A is a perspective view of the partial section of the stator core and the coil. FIG. 2B is a front view of the stator core. FIG. 2C is a developed view, in the circumferential direction, of the inner periphery of the stator core as seen from the inside. FIG. 2D is a sectional view of the partial side of the stator core and the coil. FIG. 3 is a sectional view along line A-A of FIG. 1.

The electric water pump is designed primarily for use in hybrid vehicles driven by an engine and a drive electric motor in combination so as to cool the drive electric motor or the starter-generator and its controller and other devices.

In FIG. 1, a water pump unit 1 as a pump structural body uses a centrifugal pump. The water pump unit 1 includes a pump housing 3 with a pump chamber 2 and an impeller 4 rotatably housed in the pump chamber 2.

The pump housing 3 is formed by die-casting with an aluminum alloy, a metallic material with high thermal conductivity. As shown in FIG. 3, the pump chamber 2 is formed inside the pump housing 3 so that the inner diameter thereof increases gradually depending on the circumferential position. As a result, the pump housing 3 is divided axially into two members or members 3A and 3B. The members 3A and 3B are combined into a single piece by bolts 6 after the insertion of the impeller 4 and a drive shaft 5. Further, as shown in FIG. 1, a tubular suction portion 7 is formed to project outward from the approximate center of the pump chamber in the axial direction. A tubular bearing support portion 8 is formed to project toward an electric motor unit 11 from the approximate center of the pump chamber in the axial direction. Further, as shown in FIG. 3, a discharge portion 9 is formed near the position where the inner diameter of the pump chamber 2 is largest. It is to be noted that a flowing medium discharged from the discharge portion 9, or more specifically cooling water as a cooling medium, is a freeze-resistant liquid (antifreeze) prepared by adding ethylene glycol to water, with its anticorrosion effect also improved. This cooling water is supplied to the drive electric motor and its inverter of a hybrid vehicle.

The impeller 4 in the pump chamber 2 includes an umbrella disk-shaped plate on the side of the suction portion 7, an umbrella disk-shaped plate on the side of the electric motor unit 11, and a plurality of blades (eight blades in the present embodiment) arranged radially therebetween. The impeller 4 is integrally molded by injection molding with resin material. A hole 10 is provided at the approximate center of the impeller 4. The metal drive shaft 5 in a hollow cylindrical form is press-fitted into the hole 10 and secured in place so that the drive shaft 5 and the impeller 4 rotate integrally.

With the water pump unit 1 thus constructed, the impeller 4 rotates as the drive shaft 5 rotates, permitting cooling water scraped out by the blades to flow to the outer peripheral side by centrifugal force. Cooling water thus permitted to flow to the outer peripheral side is guided along the inner peripheral surface of the pump chamber 2 into the discharge portion by inertial force. It is to be noted that negative pressure is present in the proximity of the suction portion 7 because cooling water on the impeller 4 flows to the outer peripheral side. As a result, cooling water flows in through the suction portion 7. Therefore, the pump chamber 2 is filled with cooling water at least during the rotation of the impeller 4.

Next, a description will be made of the electric motor unit 11 provided adjacent to the water pump unit 1 with reference to FIG. 1 and FIGS. 2A to 2D.

The electric motor unit 11 includes a motor housing 12 having a housing portion therein and stator cores 13 as cores, housed in the motor housing and adapted to generate a magnetic field as they are energized. The electric motor unit 11 also includes coils 14 housed in the stator cores 13 and a rotor 16 as a magnetic pole member having permanent magnets 21 arranged to be opposed to the stator.

The motor housing 12 has a housing portion 12a in a hollow cylindrical form and a sealing plate 12b adapted to seal one end of the housing portion 12a. The two portions are combined into one piece by bolts 15. Further, the opening at the other end of the housing portion 12a is sealed with the pump housing 3 by the bolts 6. As a result, part of the pump housing 3 also serves as the motor housing 12. It is to be noted that the housing portion 12a and the sealing plate 12b are formed by die-casting with aluminum alloy as with the pump housing 3. The sealing plate 12b has a bearing support portion 17 in a hollow cylindrical form which projects toward the side of the water pump unit. The bearing support portion 17 is integrally molded as with the bearing support portion 8 of the pump housing 3 so as to be opposed to the bearing support portion 8.

The inner periphery of the bearing support portion 8 of the pump housing 3 and that of the bearing support portion 17 of the motor housing 12 have each a large and small diameter portions formed axially in a stepped form. Resin bushings 18 as bearings, that is to say sliding bearings, are press-fitted into the large diameter portion. The bushings 18 are axially positioned as they touch the small diameter portion. Further, these bushings 18 have each a disk-shaped flange portion which is integrally molded at the end on the side where the two bushings face each other.

Next, the stator core 13 and the coil 14 will be described. In the present embodiment, a three-phase brushless motor is used which has the stator cores 13 for three phases and the coils 14. Therefore, the three stator cores 13, each housing the coil 14, are disposed in a laminated fashion and electrically insulated from one another in the motor housing 12 so as to be arranged side by side in the axial direction.

A description will be made of one of the three phases. The stator core 13 includes a ring-shaped member divided into two members at the approximate center in the axial direction. One of the two ring-shaped members is in the form of a claw tooth (claw magnetic pole). More specifically, this member includes an outer peripheral portion 13a which extends axially on the outermost periphery and a hollow disk-shaped circular portion 13b which is provided at the end of the outer peripheral portion. The member also includes a plurality of claw base portions 13c (12 portions in the present embodiment) which extend from the circular portion toward the inner periphery approximately at equal intervals therebetween and a plurality of claw portions 13d which extend axially from the claw base portions 13c toward the counterpart ring-shaped member in a tapered shape, that is to say approximately in a trapezoidal shape.

As shown in FIGS. 2A and 2D, the stator core 13 is formed so that the cross section thereof is approximately in the shape of letter U. The claw portion 13d is longer than the outer peripheral portion 13a. The claw portions 13d and the claw base portions 13c are connected continually on the inside in the shape of a circular arc. It is to be noted that the claw pole includes the claw base portion 13c and the claw portion 13d.

The two ring-shaped members of substantially the same shape thus constructed are combined into the stator core 13 for one phase by molding. In the molding, the two members are arranged to be opposed to each other so that the claw portions 13d of the two members are disposed alternately. Then the entire surface other than the claw portions 13d is molded with a non-magnetic resin material 19. In this process, the coil 14 is placed thereinside which is wound around the ring-shaped members in the shape of a circular arc (in a toroidal shape). It is to be noted that the coil 14 is insulation-coated. It is also to be noted that the two ends thereof are drawn out from the opposed surfaces of the ring-shaped members for energization and connected to an inverter for current control.

In hybrid and other vehicles, a high supply voltage is used, making it necessary to dispose an insulator between the coil 14 and the stator core 13. If a low supply voltage is used (as low as 12V in ordinary automobiles), however, the coil 14 may be disposed directly on the stator core 13.

It is to be noted that since the present embodiment uses a three-phase motor, the stator cores 13 of phases U, V and W are housed in the motor housing 12 by press-fitting and secured in place. In the motor housing 12, the stator cores 13 are arranged side by side in the axial direction so that the claw portions 13d are shifted in the circumferential direction by an electrical angle of 120 degrees. The coils 14 are each connected to a three-phase inverter. On the other hand, since the claw portions 13d are spaced apart in the circumferential direction by an electrical angle of 120 degrees, the coils 14 of the three phases can be wound in the same direction. As a result, all the stator cores 13 can be constructed with completely identical components. It is to be noted that the stator cores 13 have each a resin material molded on the surface. Therefore, each thereof is attached in insulated fashion to the motor housing 12. However, a space is formed between the pump housing 3 and the sealing plate 12b of the motor housing 12.

The aforementioned stator cores 13 are each made from a compressed powder core formed by compression molding of iron powder which is a magnetic powder coated with a nonmagnetic substance. Higher strength can be achieved by causing a binding agent to reside between iron powder particles.

On the other hand, a space is provided between the claw magnetic poles of the two ring-shaped members of the stator core 13 to reduce the inductance of the coil 14, as shown in FIG. 2C. The non-magnetic resin material 19 is also molded in the space between the claw magnetic poles. The resin material 19 is not molded on the inner peripheral surface of the claw portions 13d. As a result, the resin material 19 and the claw portions 13d are arranged alternately on the inner peripheral surface of the stator core 13.

Next, the rotor 16 as a magnetic member will be described. The rotor 16 includes the drive shaft 5 secured to the impeller 4 so as to be integrally rotatable, a rotator core 20 secured to the drive shaft 5 and permanent magnets 21 disposed on the outer periphery of the rotator core 20. The rotator core 20 is formed by integral molding of a cylindrical magnet attachment portion 20a which is disposed on the outer periphery and a drive shaft attachment portion 20b using a magnetic steel material. The drive shaft attachment portion 20b is narrower than the magnet attachment portion 20a and disposed at the approximate center of the same 20a. In other words, the two portions are molded so that the axial cross-section is approximately in the shape of letter H. Further, a hole 20c is formed on the inner periphery of the drive shaft attachment portion 20b. As the drive shaft 5 is press-fitted into the hole 20c, the rotator core 20 and the drive shaft 5 are secured together so as to be integrally rotatable. Still further, the plurality of rod-shaped permanent magnets 21 extending in the axial direction are secured in the circumferential direction on the outer periphery of the magnet attachment portion 20a. The permanent magnets 21 are arranged so that the magnetic poles of every two adjacent magnets are different from each other.

The rotor 16 thus constructed is disposed so that the inner peripheries of the stator cores 13 and the permanent magnets 21 are opposed to each other. The drive shaft 5 is rotatably supported by the two bushings 18. The drive shaft 5 is prevented from moving in the axial direction by flange portions of the two bushings 18.

Further, cooling water is introduced toward the rotor 16, for example, through the gap between the drive shaft 5 and the pump housing 3, along the inner periphery of the drive shaft 5 and through the gap between the inner periphery of the bushings 18 and the outer periphery of the drive shaft 5. As a result, the rotor 16 rotates in cooling water. At this time, cooling water is constantly introduced between the bushings 18 and the drive shaft 5, thus allowing to construct smooth sliding bearings.

Next, the operation of the electric motor unit 11 thus constructed will be described below.

The coils 14 are supplied with current from a power source such as battery via the three-phase inverter. As a result, different magnetic poles are generated on first and second claw magnetic poles, the first claw magnetic pole extending from one of the ring-shaped member of the stator core 13, the claw magnetic pole extending from the other ring-shaped member. For example, if N pole is generated on the first claw magnetic pole, S pole is generated on the second claw magnetic pole. In the present embodiment, the coils 14 have the phases U, V and W. This makes it possible to regulate energization of each of the coils, thus switching the magnetic poles as if they rotate. As a result, the permanent magnets 21 on the rotor 16 which are opposed to the claw magnetic poles move in the rotational direction together with magnetic fields generated by the claw magnetic poles. This causes the rotor 16 to rotate. It is to be noted that the rpm of the drive shaft 5 can be controlled by controlling the energization of the coils 14 of the phases U, V and W.

To control the rotation of the rotor 16, detection of the position of the same 16 is normally required by a magnetic pole position detector. However, the present embodiment uses the induced voltage position detection method adapted to detect the magnetic pole position from the voltage induced in the coil 14, thereby switching the energization of the coils 14 of the three phases. That is to say, the present embodiment uses a sensorless method to detect the position of the rotor 16. It is to be noted that the load change of the impeller 4 of the water pump unit is slow. As a result, the use of such a method is sufficiently possible.

Although the present embodiment has been described to cool the drive electric motor or the starter-generator and its controller in hybrid vehicles, the invention may be used as a pump to cool the engine or warm the cabin. Here, a vehicle with the electric pump will be described with reference to FIG. 4. A hybrid vehicle will be described as an example.

Figure 4:
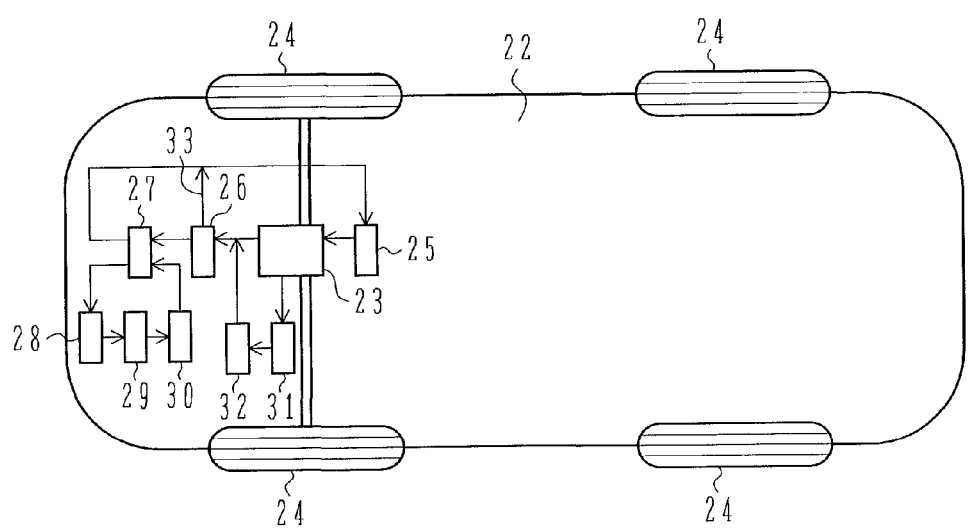
FIG. 4 is an explanatory view of a vehicle with the electric pump.

In FIG. 4, the engine room of a vehicle 22 has an engine 23 coupled via a transmission (not shown) to wheels 24 which drive the vehicle. Here, cooling water supplied by a first electric pump 25 removes heat from the engine 23 to cool the engine 23. Cooling water is cooled down as it releases heat removed from the engine 23 via a thermostat 26 to a radiator 27 and returns to the first electric pump 25. On the other hand, cooling water supplied by a second electric pump 28 cools an inverter 29 and a traveling motor 30. Then cooling water is cooled down by the radiator 27, shared by cooling water from the first electric pump 25, and returns to the second electric pump 28. Further, cooling water supplied by a third electric pump 31 is introduced into part of cooling water circulated by the first electric pump 25 to release heat from the engine 23 into the cabin by a cabin heater 32 and returns to the original flow path. It is to be noted that a bypass channel 33 is provided to allow the cooling medium to bypass the radiator 27 if the thermostat 26 determines that the engine 23 has not warmed up.

Next, the operation and effects of the present embodiment will be described.

In the present embodiment, the coils are wound around and along the cores in a ring shape, thus eliminating coil ends which would otherwise not contribute to generation of a torque. This makes it possible to bring the cores and the pump structural body closer together to the extent possible, thus permitting size reduction and thereby providing improved mountability.

It is to be noted that when these pumps are mounted in a vehicle, the engine room which will accommodate the pumps is a crowded space with a variety of parts housed therein. In particular, recent years have seen a drastic increase in the number of parts mounted in the engine room because, for example, of hybridization and functional improvement. As a result, there is a growing tendency to require the parts accommodated therein to be smaller and lighter than parts accommodated in other rooms. In light thereof, it is extremely beneficial to use pumps as those described above.

Such electric pumps are finding wider use as shown in FIG. 4. These pumps have two advantages. One of the advantages is that the pumps occupy a smaller space in the engine room thanks to size reduction. The other advantage is that the inverter and the traveling motor of hybrid vehicles can be reduced in size because of higher power output of the electric pumps, thus contributing to improved layout flexibility and, in a broader sense, improved vehicle performance. Thus, these electric pumps are advantageous not only as pumps alone but also in terms of the vehicle as a whole.

In addition, the coils are easy to be manufactured. Besides, they are easier to be molded after being wound around the cores as compared to coils wound around laminated cores. This ensures a high proportion of space occupied by the coils in the coil housing space, thus reducing coil resistance and thereby providing a motor with high efficiency. Further, improved occupancy ratio ensures reduced thermal resistance between the coils and cores, thus rendering the drive motor capable of withstanding a large load. Conversely these advantages can be taken advantage of to reduce the size and weight of the motor. Still further, the length of one turn of coil can be reduced, thus providing reduced resistance and ensuring higher motor efficiency.

In the present embodiment, multiphase cores are used, ensuring easy and positive control.

In the present embodiment, the pump structural body is disposed adjacent to at least one end of the core and magnetic pole member so that the pump structural body discharges a cooling medium. This ensures effective cooling of the cores and magnetic member.

In the present embodiment, no coil end is present, making it possible to provide a pump housing at one axial end of the motor housing. This improves the cooling effect. In this case, other effects can also be achieved, including reduction in parts, size reduction and weight reduction.

In the present invention, the pump and motor housings are molded with the same material, thus ensuring efficient cooling. In particular, the use of aluminum alloy, a material with high thermal conductivity, provides added cooling effect.

In the present embodiment, the bearings of the magnetic pole member are disposed along the inner periphery of the magnetic pole member. This provides a shorter axial length of the pump while securing appropriate bearing lengths, thus contributing to size and weight reduction. In particular, the rotor core as a magnetic member has a large enough margin in terms of magnetic flux produced. Therefore, it is possible to reduce the axial length of the pump and dispose the sliding bearings inside the rotor.

In the present embodiment, the cores are made of compressed powder cores, thus allowing easy manufacture of complicated three-dimensional shapes. Further, the compressed powder core is one piece as a whole in contrast to a conventional laminated core manufactured by punching out thin steel sheets. As a result, this core is structurally rigid and difficult to vibrate, thus keeping noise low. When constructed in the aforementioned shape, the core can be made into a motor offering further reduced vibration and noise. Still further, the core can be molded with a necessary raw material, thus providing a material utilization ratio of 100% and keeping manufacturing cost low.

In the present embodiment, the stator cores as cores are molded with a non-magnetic material, thus providing enhanced strength even if the stator cores are made from compressed powder cores. Further, the cores can be improved in durability so as to prevent corrosion of the coils as cooling water as liquid is introduced therein. Still further, the stator cores can be readily sealed so as to prevent external cooling water leakage. As a result, there is no need to provide a cooling medium shield separately between the stator cores and the rotor as is conventionally practiced. Instead, the stator cores can be formed directly on the stator surfaces facing the rotor. This reduces the magnetic gap, thus preventing a reduction of torque resulting from an increased gap length due to the presence of a shield, that is to say low efficiency and other problems. Therefore, not only size and weight reduction but also high efficiency can be achieved. In particular, the use of resin, a non-magnetic material, will prevent corrosion and other problems caused by cooling water.

In the present embodiment, the inner peripheral surfaces of the stator cores are constructed so that the non-magnetic material and the magnetic poles are formed alternately in the circumferential direction. This allows the stator cores to be located on the stator surfaces facing the rotor, thus reducing the magnetic gap length and providing improved motor characteristics. Further, enhanced cooling effect of the stator cores will be achieved.

In the present embodiment, cooling water as cooling liquid is introduced into the stator cores and the ends thereof. This ensures efficient cooling of not only the stator cores and coils but also the rotor with cooling water. Such an effective removal of heat also allows for a compact, lightweight and highly efficient construction. Further, the rotor is supported by bearings in cooling water, allowing for smooth supporting of the rotor with inexpensive sliding bearings. In particular, the drive shaft is hollow so that cooling water is readily introduced into the two bearings, thus ensuring further smooth supporting of the rotor.

In the present embodiment, the claw portions of the cores are inclined in a tapered shape. This reduces cogging torque of the motor and brings the waveform of the coil induced voltage closer to a sine wave. As a result, supplying a sine wave current produces a constant torque from the three phases with minimum pulsation in the rotational direction. This provides low motor noise.

Thus, in the present embodiment, an electric water pump has been described as an example of electric pump. The present invention is also applicable, for example, to a power steering pump adapted to supply oil to a hydraulic power steering system, oil pumps such as lubricating pump adapted to supply lubricating oil to the engine, a compressor which uses a gas as its cooling medium and an electric oil pump which uses oil as its cooling medium. However, the present invention is more useful for use as a pump adapted to discharge a cooling medium as it is capable of efficiently cooling the electric motor unit. It is to be noted that the pump unit need not necessarily be a centrifugal pump. Instead, it may be a vane pump, gear pump, plunger pump, and so on.

In the present embodiment, the pump and motor housings are formed with the same material. The two housings share a part thereof. However, the two housings may be formed with different materials and separately. This allows for selection of materials suited for application. The pump and motor housings need not necessarily be made of a metallic material. Selection of a resin material is also possible. A resin material with high thermal conductivity such as unsaturated polyester will provide effective cooling.

In the present embodiment, an impeller made of a resin material is used. However, the impeller may also be formed by metal stamping, die-casting or casting of a metallic material. This will enhance the impeller strength.

In the present invention, the impeller and the drive shaft are constructed with separate members. However, they may be integrally molded. This will reduce the parts count.

In the present embodiment, metal bushings are used to support the drive shaft. However, resin bushings may also be used. Further, needle or ball bearings may also be used. It is to be noted that if needle or ball bearings are used, they should be kept away from cooling water to the extent possible. A seal is required to prevent cooling water from flowing back and forth between the pump unit and the electric motor unit. In this case, the rotor does not rotate in cooling water, but does in air. It is preferable that grease or other lubricating oil be applied to the bearings for lubrication.

In the present embodiment, the cores remain stationary whereas the rotor with permanent magnets as magnetic members rotates. However, a so-called DC motor may also be used in which the core rotates as the rotor as the coil is supplied with current from a brush whereas the permanent magnets remain stationary as the stator. Further, a so-called induction motor may also be used in which a separate core and coil are used in place of the permanent magnets.

In the present embodiment, the stator cores are made from compressed powder cores. However, the stator cores may be formed by cutting or stamping. The cores formed by such processes can be enhanced in strength as compared to compressed powder cores.

In the present embodiment, the non-magnetic material and the magnetic poles are formed alternately on the inner peripheries of the stator cores in the circumferential direction. However, the entire inner peripheries of the same may be molded. This will prevent corrosion of the stator cores caused by cooling water.

In the present embodiment, the electric motor unit and the controller thereof such as inverter are provided separately. However, they may be formed integrally and disposed at the end of the motor housing on the side opposite to the pump housing. This will provide an electric motor of more compact construction.

In the present embodiment, the induced voltage position detection method, a sensorless method, is used to detect the rotor position. However, the provision of a magnetic pole position detector will provide a reduced startup time.

In the present embodiment, the stator cores are molded phase by phase, after which they are secured in the motor housing. However, the stator cores may be secured in the motor housing first and then molded together with the motor housing.

In the present embodiment, a resin molded portion and a space are provided between the stator cores and the pump housing. However, if the pump housing is made of a non-magnetic material such as aluminum alloy, the stator cores and the pump housing may be directly in contact with each other. This allows heat from the coils to directly escape to the refrigerant via the pump housing, thus providing enhanced cooling effect and permitting size and weight reduction. Further, the resin molded portion may be eliminated so that only a space is provided between the stator cores and the pump housing. If, as a result of this construction, the refrigerant can be brought in direct contact with the side surfaces of the stator cores, heat will be able to escape directly from the stator windings via the stator cores to the refrigerant, thus permitting further size reduction.

In the present embodiment, the stator cores of the phases U, V and W are spaced apart in the circumferential direction by an electrical angle of 120 degrees. However, the stator cores may be spaced apart in the circumferential direction by an electrical angle of 60 degrees. In this case, the phase sequence is U, W and V. The coil of the phase W at the center must be wound in the reverse direction.

In the present embodiment, the claw portions of the cores are inclined in a tapered shape. However, they may be parallel to each other in the axial direction.

Second Embodiment

FIGS. 5A to 5C illustrate the electric water pump of a second embodiment. FIG. 5A is a sectional view of the axial side surface of the electric water pump as the second embodiment. FIG. 5B is a sectional view along line B-B of FIG. 5A. FIG. 5C is a side view of only the stator cores molded with a resin which is a non-magnetic material. It is to be noted that the same parts as those in the first embodiment are termed the same names and denoted by the same reference numerals.

The second embodiment differs from the first embodiment in that the molded portion 19 of the stator cores 13 molded with a resin, a non-magnetic material, is provided with channels 34 through which cooling water as a cooling medium can flow.

As shown in FIG. 5B, the channels 34 include channels 34a, 34b and 34c. The channel 34a is an annular channel provided in an annular shape at the approximate center of the circular portion in the direction of radius on the axial end surface of the stator cores 13. The channels 34b are radial channels provided radially, each located at the center of one of the magnetic poles, that is to say at the approximate center of each of the claw base portions 13c in the circumferential direction. The channels 34c are axial channels as shown in FIG. 5C, each extending from each of the radial channels approximately in the axial direction on the axial side surfaces of the stator cores 13. The channels 34 are formed on the two end surfaces and the side surfaces of the stator cores 13 of the three phases. These channels are molded by the mold used for injection molding of resin. Each of the stator cores 13 has the same channels as the other cores. As a result, when the stator cores 13 of the three phases are axially arranged side by side, the identically shaped annular and radial channels 34a and 34b of the adjacent cores are brought face to face. The channels 34c of the adjacent cores are also located at the same positions, permitting communication between the channels 34c.

As described above, in the present embodiment, the channels 34 permit cooling water to fill into the inner peripheral sides of the stator cores 13, thus providing improved cooling effect.

In the present embodiment, some radial channels are provided, thus ensuring effective distribution of cooling water.

In the present embodiment, some channels are provided between the stator cores, thus allowing for cooling of each of the cores.

In the present embodiment, some channels are formed, each at the center of one of the magnetic poles, thus allowing for cooling of the locations most needed to be cooled.

In the present embodiment, the molded portion of each of the stator cores has annular and axial channels. As a result, cooling can be accomplished between the stator cores, between the stator cores and the pump housing and between the stator cores and the motor housing. This permits distribution of the refrigerant all around the electric motor, thus providing further improved cooling effect and an even more compact motor.

In the present embodiment, the rotor is rotatably disposed to face the inner peripheries of the stator cores. As a result, when the rotor rpm is high, cooling water flows into the areas of the inner peripheries of the stator cores opposed to the rotor. The pressure drops with increase in flow rate. This creates a pressure difference between the pump housing and motor housing sides of the stator cores not opposed to the rotor. As a result, cooling water circulates through the channels. This provides further improved cooling effect.

In the present embodiment, the channels provided on all the molded portions of the stator cores are identically shaped. This permits molding of the channels with a single mold, thus providing an inexpensive pump.

In the present embodiment described above, the channels are formed with a mold. However, the channels may be formed by cutting.

In the present embodiment, annular channels are provided. However, if these channels are omitted, all the channels can be formed by molding the plurality of stator cores in a single step.

Third Embodiment

Figure 6:
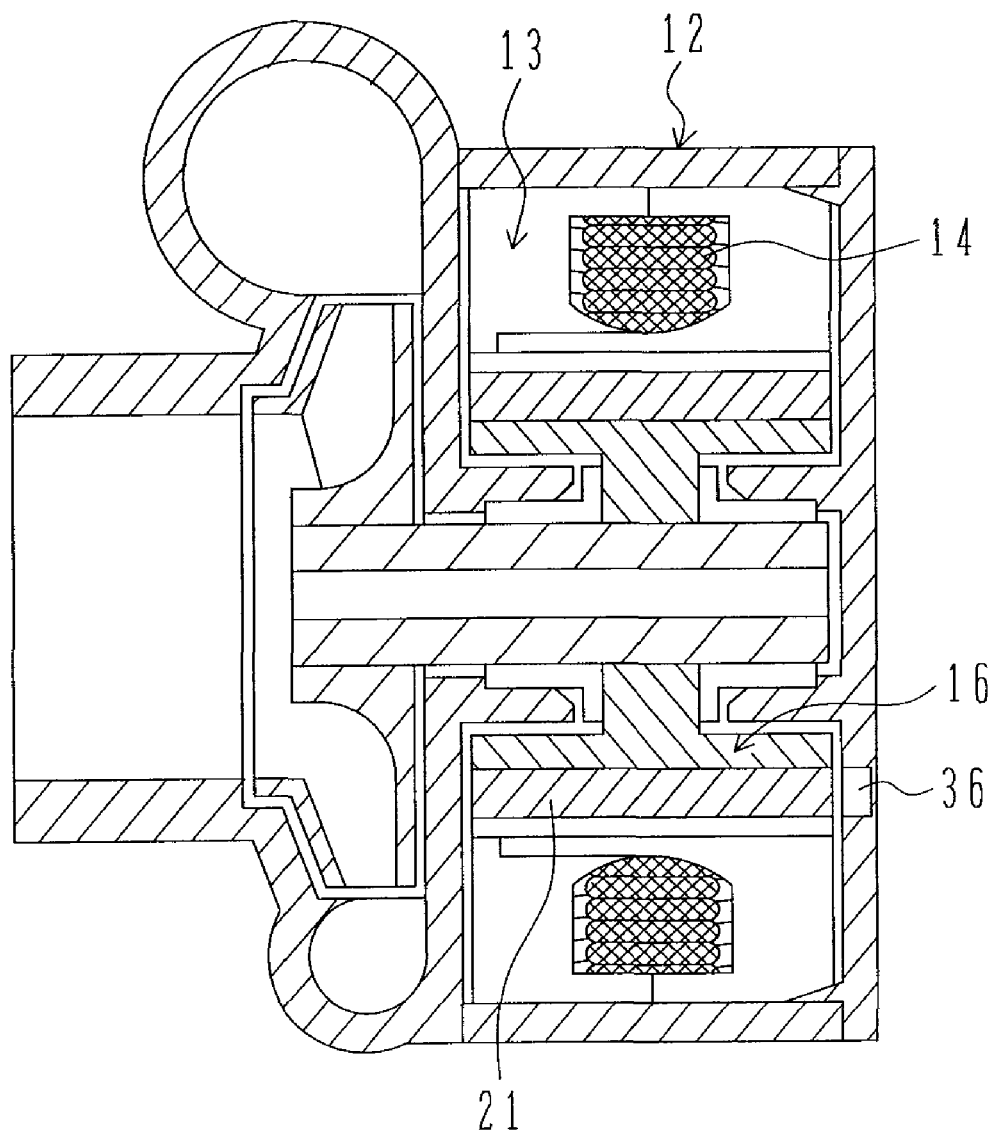
FIG. 6 is a sectional view of the axial side surface of the electric water pump according to a third embodiment of the present invention.
Figure 7A:
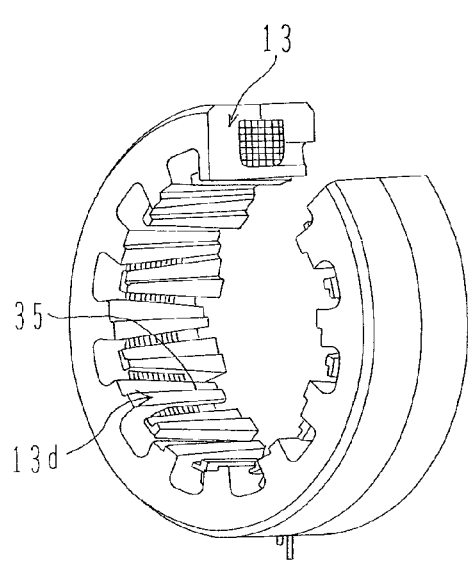
FIGS. 7A and 7B are views describing in detail the stator core and the coil according to the third embodiment of the present invention.
Figure 7B:
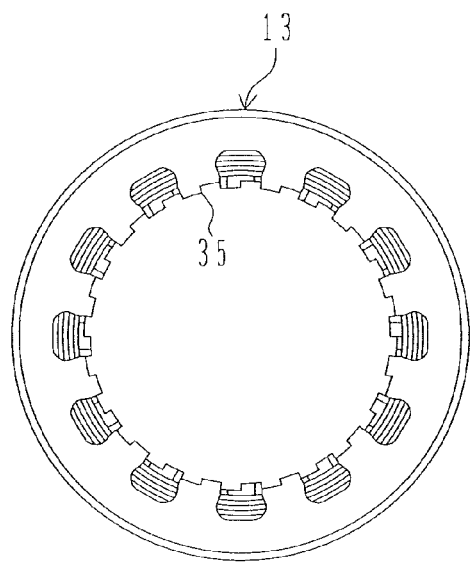

FIG. 6 and FIGS. 7A and 7B illustrate the electric water pump of a third embodiment. FIG. 6 is a sectional view of the axial side surface of the electric water pump of the third embodiment. FIGS. 7A and 7B are views describing in detail the stator core and coil of the third embodiment. FIG. 7A is a perspective view of the partial section of the stator core as a core and the coil of the third embodiment. FIG. 7B is a front view of the stator core. It is to be noted that the same parts as those in the first embodiment are termed the same names and denoted by the same reference numerals.

The third embodiment differs from the first embodiment in that a single-phase motor is used which includes the single-phase stator core 13. The third embodiment also differs in that a stepped portion 35 is provided on one circumferential side of each of the claw portions 13$d$ of the claw magnetic poles. The third embodiment also differs in that a position detector 36 is provided to detect the rotor position.

The stator core 13 is almost identical to one of the stator cores 13 extracted from the first embodiment. In the former stator core 13, however, each of the claw portions 13$d$ of the claw magnetic poles extending from both ends of the stator core 13 has the stepped portion 35, as shown in FIGS. 7A and 7B. The stepped portions 35 are provided as magnetic field deviation portions to deviate a magnetic field in one circumferential direction. These portions are provided on the same side so that one circumferential side is farther from the rotor than the other circumferential side. The stepped portions 35 each have a step at the approximate center in the circumferential direction of the claw portion.

As shown in FIG. 6, the position detector 36 is installed in a depressed portion which is provided on the inside at the end of the motor housing 12 on the side opposite to the pump. The position detector 36 detects leak magnetic flux of the permanent magnet 21 on the rotor 16, thus detecting the position of the permanent magnet 21, that is to say the position of the rotor 16.

Next, a description will be made of the control configuration of the single-phase motor of the third embodiment with reference to a control configuration diagram of FIG. 8.

Figure 8:
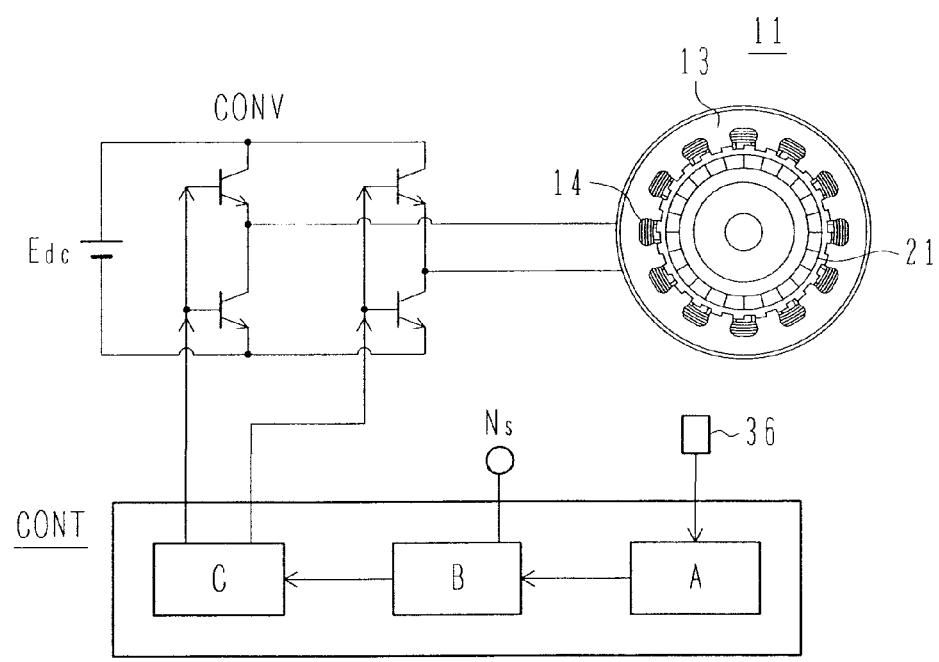
FIG. 8 is a diagram showing a control configuration according to the third embodiment of the present invention.

In FIG. 8, the single-phase motor includes the electric motor unit 11, a converter CONV adapted to supply AC power from a DC power supply Edc to the electric motor unit 11, and a control circuit CONT adapted to control the converter CONV.

Here, the control circuit CONT includes an angle converter A which converts the output from the position detector 36 into angle information, a speed control circuit B, and a converter output circuit C. In this configuration, the angle converter A receives information about leak magnetic flux of the permanent magnet 21 from the position detector 36 and outputs rotor position information based on the received information. Measuring the period of electric angle in a half cycle of the output signal from the position detector 36 makes it possible to determine the rotor position information and the energization direction, that is to say whether to turn on positive or negative switching devices of the converter CONV. The speed control circuit B calculates an error speed based on an externally given speed command Ns and the aforementioned speed information. The speed control circuit B submits the error to proportional-integral and other control before sending a control output to the converter output circuit C. This allows to control the converter CONV including an H bridge, thus controlling the speed to the target speed specified by the speed command Ns.

The above control is intended for fans and pumps. The response frequency for this control is extremely low or several hertz or less. As a result, the control is performed in a stable manner.

Next, a description will be made of the operating principle and the operation at constant rotation speed of the single-phase motor of the third embodiment with reference to waveforms in FIGS. 9A to 9G.

Figure 9:
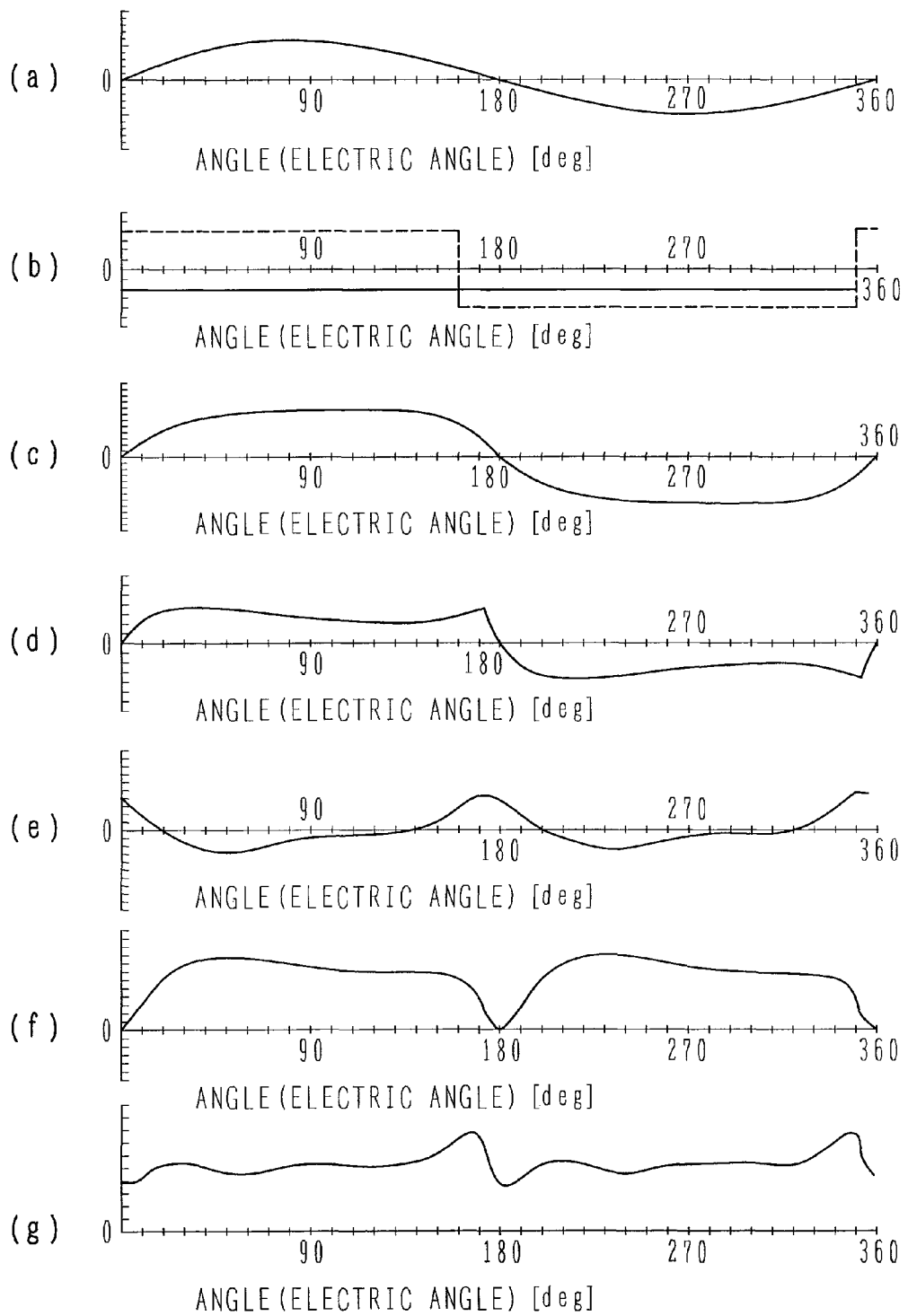
FIGS. 9A to 9G are graphs illustrating the operating principles of the third embodiment.

In the waveforms of FIGS. 9A to 9G, the horizontal axis represents a position θ of the rotor 16 in the range from 0 to 360 degrees in electrical angle. FIG. 9A illustrates an output signal of the position detector 36. FIG. 9B illustrates a voltage Vt (θ) applied to the coil 14 of the electric motor. FIG. 9C illustrates a voltage V0 (θ) induced across the coil 14 by the magnetic flux of the permanent magnet 21. FIG. 9D illustrates a coil current iw (θ). The coil current iw (θ) is determined by the voltage Vt (θ) in FIG. 9B, the induced voltage V0 (θ) in FIG. 9C, and a resistance r and an inductance L of the coil 14 using the following formula:

$$Vt(\theta)=(r+p)iw(\theta)+V0(\theta) \tag{1}$$

where ps is d/dt.

FIG. 9E illustrates a cogging torque Tc (θ) generated between the stator core 13 and the permanent magnet 21 when there is no current flow. FIG. 9F illustrates a torque T0$w$ (θ) generated by the induced voltage and the coil current. An output P0$w$ (θ) expressed by the product of the induced voltage V0 (θ) in FIG. 9C and the current iw (θ) in FIG. 9D represents the output produced by the magnetic flux of the permanent magnet 21 and the coil current. If an angular velocity ω of the rotor 16 is constant, the torque T0$w$ (θ) is given by the following formula:

$$T0w(\theta)=P0w(\theta)/\omega \tag{2}$$

FIG. 9G illustrates a total torque T (θ) of the electric motor. This torque is the sum of the torque T0$w$ (θ) generated by the induced voltage and the coil current and the cogging torque Tc (θ) and given by the following formula:

$$T(\theta)=T0w(\theta)+Tc(\theta) \tag{3}$$

If the angular velocity ω of the rotor 16 is constant, the total torque will have the same waveform as the output torque.

The cogging torque of the single-phase motor exhibits a waveform as shown in FIG. 9E relative to the rotating position because of the stepped portions intentionally provided only on one side of the surface of each of the claw portions 13$d$ of the stator core 13. Next, a description will be made of the torque T0$w$ (θ) generated by the induced voltage and the coil current. The torque T0$w$ (θ) makes up the main torque of the single-phase electric motor. First, the induced voltage generally exhibits a rectangular waveform as shown in FIG. 9C. If the polarity of the applied voltage is switched at the zero-cross point of the output signal of a Hall device, as shown in FIG. 9A, which is disposed at a position slightly leading the induced voltage (the output signal of the Hall device is shaped into a sine wave by moving the Hall device away from the permanent magnet), the voltage as shown in FIG. 9B is applied to the coil 14. As a result, the current shown in FIG. 9D flows, causing a torque to be generated by the current flowing into the coil 14 and the voltage induced thereacross as shown in FIG. 9F. This output exhibits the waveform as shown in FIG. 9F as the induced voltage dips twice to near zero over a range of 360 degrees in electric angle. These voltage dips occur due to the operating principle of the single-phase drive motor. If these dips and the positive components of cogging torque are added together, a nearly uniform torque can be produced as a whole.

As described above, the motor of the present embodiment is a single-phase motor, allowing for significant reduction in parts count and thereby making the pump inexpensive. Further, although not producing a uniform torque as by a three-phase motor, the single-phase motor can be rendered capable of producing a comparably flat torque. This torque non-uniformity can be eased by changing the angle by which the applied voltage leads the induced voltage and by changing the applied voltage waveform. These changes can be accomplished by causing the applied voltage to increase smoothly at the leading edge and to decline gradually at the trailing edge. Another factor involved is conformity between the cogging torque waveform and that of the torque generated by the induced voltage and the coil current. The output torque can be made flat relative to the rotor angle θ by generating the cogging torque optimally in the recessed position on the claw portion surface.

In the present embodiment, an H-bridge control circuit can be used, thus reducing the number of switching devices to only two. This ensures simple circuit configuration including gate circuits, providing a controller configured at low cost.

As described above, in the present embodiment, the stepped portions are provided on the claw portions as magnetic field deviation portions. However, these portions need not be stepped as long as one circumferential side thereof is farther from the rotor than the other circumferential side thereof. For example, one circumferential side of the claw portion may be smoothly thicker than the other circumferential side thereof. Further, the claw portion thickness in the circumferential direction may be the same. In this case, a material highly permeable to magnetic flux may be provided on one circumferential side of the claw portion, and a material not highly permeable on the other circumferential side thereof. Still further, the claw portion may be made of different materials in the circumferential direction so as to change the amount of passing magnetic flux in the circumferential direction. These constructions eliminate steps, ensuring a longer mold life.

Fourth Embodiment

Figure 10:
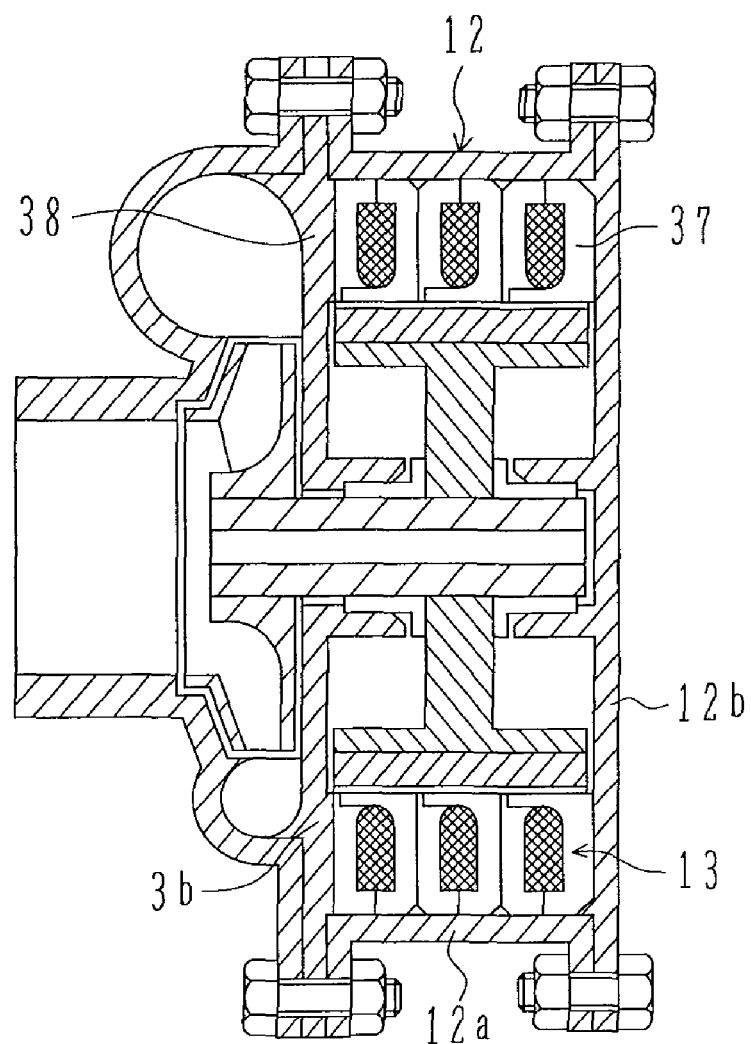
FIG. 10 is a sectional view of the axial side surface of the electric water pump according to a fourth embodiment of the present invention.

FIG. 10 and FIGS. 11A to 11D illustrate the electric water pump of an fourth embodiment. FIG. 10 is a sectional view of the axial side surface of the electric water pump of the fourth embodiment. FIGS. 11A to 11D are views describing in detail the stator core as a core of the fourth embodiment. FIG. 11A is a front view of the stator core for one phase. FIG. 11B is a side view of the stator core for one phase. FIG. 11C is a rear view of the stator core for one phase. FIG. 11D illustrates the stator cores for three phases as they are positioned in the rotating direction and laminated together. It is to be noted that the same parts as those in the first embodiment are termed the same names and denoted by the same reference numerals.

The fourth embodiment differs from the first embodiment in that the axial ends of the stator cores 13 are in close contact with the motor housing 12, and that a rotation stop mechanism is provided to restrict the relative rotation of the stator core 13 or the motor housing 12 adjacent to the axial end of each of the stator cores 13.

As shown in FIGS. 11A and 11B, the circular portion 13b on the side of the axial pump chamber 2 in the stator core 13 has recessed portions 37 which make up part of the rotation stop mechanism. The recessed portions 37 are provided as three grooves formed radially on both circumferential sides of each of the two adjacent claw base portions 13c. It is to be noted that the circumferential angle formed by the recessed portions 37 is such that the stator cores are spaced apart in the circumferential direction by an electrical angle of 120 degrees.

As shown in FIGS. 11B and 11C, a projected portion 38 which makes up the rotation stop mechanism together with the recessed portions 37 is molded integrally on the circular portion 13b on the side of the sealing plate 12b in the stator core 13. The projected portion 38 is located at the back of the recessed portion 37 in the middle of the three recessed portions 37 arranged in the circumferential direction. The projected portion 38 is provided engageably with the recessed portion 37 and has approximately the same shape as the same 37.

Further, as shown in FIG. 10, the sealing plate 12b as the motor housing 12 has the recessed portion 37 which is provided engageably with the projected portion 38 of the stator core 13 at one circumferential location. A housing 3b which serves both as the motor and pump housings also has the projected portion 38 which is provided engageably with the recessed portion 37 of the stator core 13 at one circumferential location. It is to be noted that the recessed portions 37 and the projected portions 38 are formed almost in the same shape.

In the engagement of the recessed portions 37 with the projected portions 38 thus provided, the projected portion 38 of one of the stator cores 13 engages with the circumferentially outer one of the three recessed portions 37 of the adjacent stator core 13 as shown in FIG. 11D. Further, the recessed portion 37 of one of the stator cores 13 engages with the projected portion 38 of the housing 3b which serves both as the motor and pump housings. Still further, the projected portion 38 of one of the stator cores 13 engages with the recessed portion 37 of the sealing plate 12b.

As described above, in the present embodiment, the stator cores for the plurality of phases are positioned in place by the rotation stop mechanism, thus permitting positive and easy positioning of the stator cores to a position corresponding to the desired electrical angle.

In the present embodiment, the rotation stop mechanism includes the recessed and projected portions, providing increased contact area with the motor housing. This ensures heat removal from the motor housing which is cooled by the adjacent pump structural body, thus providing improved cooling effect. Particularly in the present embodiment, the recessed portions include grooves. As a result, the projected portions can be formed long in a rectangular shape, allowing for easier heat transfer.

In the present embodiment, the plurality of recessed portions are provided on each of the stator cores. This allows for positioning of the stator cores to a circumferential position appropriate to the desired electrical angle, thus providing improved productivity.

As described above, in the present embodiment, the rotation stop mechanism includes the recessed and projected portions. However, separate members may be attached to the stator cores to stop the rotation.

In the present embodiment, the recessed portions include grooves, and the projected portions rectangular protrusions. However, the recessed portions may include holes, and the projected portions circular protrusions. In this case, the area of the recessed and projected portions is smaller. However, this construction will reduce the impact on the magnetic circuit.

In the present embodiment, the stator cores have the same shape. However, the stator cores may have the projected and recessed portions at different positions. This eliminates the need to provide the plurality of recessed portions. As a result, the impact on the magnetic circuit can be reduced if the projected and recessed portions are distributed in the circumferential direction.

In the present embodiment, the motor housing 12 is provided. However, the motor housing can be omitted if the stator cores are clamped together axially by a fixing member such as bolts and a sealing member is provided for each of the stator cores to prevent cooling water leak. This permits parts count reduction, thus providing an inexpensive pump. It is to be noted that the number of sealing members can be reduced by increasing the number of areas integrally molded with resin.

Next, the features of the invention other than those described in the appended claims, which are understandable from the foregoing embodiments, will be described together with the effects thereof.

(1) A feature of the invention is an electric pump adapted to discharge a liquid and driven by an electric motor. The electric pump includes a stator core having a coil wound therein and on which different magnetic poles are alternately formed on the inner periphery thereof as the coil is energized. The electric pump also includes a rotor adapted to rotate in a liquid and opposed to the magnetic pole forming portions of the stator core so that different magnetic poles are alternately formed in the circumferential direction. The electric pump also includes a pump structural body adapted to discharge a liquid as it is given a rotational force by the rotor. The electric pump also includes non-magnetic partitions provided between the stator core and the rotor and integrally formed on the inner periphery of the stator core. Such a construction allows to form partitions where necessary and as many of them as necessary between the stator core and the rotor, providing a solution to the problem of the conventional electric motor which requires separate partitions between the stator core and the rotor. This will permit size reduction.

(2) Another feature of the invention is an electric pump adapted to discharge a cooling medium and driven by an electric motor. The electric pump includes a stator core having a coil wound therein and on which different magnetic poles are alternately formed on the inner periphery thereof as the coil is energized. The electric pump also includes a rotor adapted to rotate in a liquid and opposed to the magnetic pole forming portions of the stator core so that different magnetic poles are alternately formed in the circumferential direction. The electric pump also includes a pump structural body adapted to discharge a liquid as it is given a rotational force by the rotor. The electric pump also includes channels, provided on the stator core, through which the cooling medium circulates in the stator core as the rotor rotates. Such a construction ensures sufficient cooling of the stator core irrespective of the electric motor construction, thus providing a solution to the problem of the prior art electric motor in which sufficient cooling of the stator core cannot be achieved.

(3) Still another feature of the invention is an electric pump of claim 5 having the motor and pump housings made of the same material. Such a construction ensures efficient heat transfer from the motor housing to the pump housing.

What is claimed is:

1. An electric pump mounted in a vehicle, comprising:
   an electric motor and a pump structural body,
   said electric motor including:
   a stator comprising a stator core and a stator coil, and
   a rotor constituted so that different magnetic poles are formed in the circumferential direction alternatively, and supported rotatably;
   wherein said stator core having a plurality of first claw magnetic poles and a plurality of second claw magnetic poles, each of said plurality of first and second claw magnetic poles extending from an axial end of said core toward the other end of said core, and each of said plurality of first and second claw magnetic poles being formed alternatively in the circumferential direction;
   said stator coil wound inside said core in a ring form, said stator coil generating different magnetic poles on said first and second claw magnetic poles upon being energized;
   said plurality of first and second claw magnetic poles comprise a claw part which counters a rotor perimeter side and a claw base arranged at both sides of the rotor in the direction along in a rotation axis direction of said stator coil, respectively;
   said plurality of first and second claw magnetic poles have a thickness in a direction of a path of the tip part of said claw part is less than a thickness in the direction of a rotation axis of said claw base; and
   said pump structural body adapted to discharge a flowing medium as a rotational force is given to said pump structural body by said rotor.

2. The electric pump of claim 1, wherein
   wherein said core is formed to include a single phase, and
   wherein magnetic field deviation portions are provided on said first and second claw magnetic poles to deviate a magnetic field in one circumferential direction.

3. The electric pump of claim 2, wherein
   said magnetic field deviation portions are provided so that one circumferential side of said first and second claw magnetic poles is farther from said magnetic pole member than the other circumferential side thereof.

4. The electric pump of claim 1, wherein
   said core is formed to include a plurality of phases.

5. An electric pump adapted to discharge a cooling medium, the electric pump comprising:
   an electric motor having
   a coil wound in a ring form;
   a core formed of a claw part and a claw base along said coil in a tubular form so that different magnetic poles are formed alternately in a circumferential direction of said core as said coil is energized wherein a thickness of the claw base in a rotation direction of said core is greater than a thickness of said claw part in a direction transverse to the rotation direction; and
   a magnetic pole member opposed to said magnetic pole forming portions of said core and relatively rotatable with said core so that different magnetic poles are formed in the circumferential direction; and
   a pump structural body disposed adjacent to at least one end of said core and magnetic pole member so that said pump structural body discharges a cooling medium as a rotational force is given to said pump structural body by said core or magnetic pole member.

6. The electric pump of claim 5,
   wherein said core and said magnetic pole member are housed in a motor housing; and
   wherein one axial end of said motor housing serves also as a pump housing adapted to house said pump structural body.

7. The electric pump of claim 5, wherein
the side end portion of said pump structural body disposed along the inner periphery of said motor housing is in close contact with said core.

8. The electric pump of claim 5, wherein
a rotation stop mechanism is provided between the side end portion of said pump structural body disposed along the inner periphery of said motor housing and said core to restrict the relative rotation of said core.

9. The electric pump of claim 8, wherein
said rotation stop mechanism comprises a projected portion on one side and a recessed portion on the other side.

10. The electric pump of claim 8, wherein
wherein said cores are formed to include a plurality of phases; and
wherein said rotation stop mechanism is provided on said core for each phase.

11. The electric pump of claim 5, wherein
bearings for said magnetic pole member are disposed along the inner periphery of said magnetic pole member.

12. An electric pump adapted to discharge a liquid, the electric pump comprising:
an electric motor having
a coil wound in a ring form;
a stator core formed of a claw part and a claw base along said coil in a tubular form and made from a compressed powder core so that different magnetic poles are formed alternately in the circumferential direction as said coil is energized, said core having a molded portion, formed by molding a non-magnetic material, at least on the inner periphery thereof wherein a thickness of the claw base in a rotation direction of said core is greater than a thickness of said claw part in a direction transverse to the rotation direction;
a rotor opposed to said magnetic pole forming portions of said stator core so that different magnetic poles are formed in the circumferential direction, with said rotor rotating in a liquid; and
a pump structural body adapted to discharge liquid as a rotational force is imparted to said pump structural body by said rotor.

13. The electric pump of claim 12, wherein
said non-magnetic material is a resin material.

14. The electric pump of claim 12, wherein
said molded portion is provided over the entire inner periphery of said stator core.

15. The electric pump of claim 12, wherein
said non-magnetic material and said magnetic pole are formed alternately on the inner peripheral surface of said stator core.

16. The electric pump of claim 12,
wherein said stator core is formed to include a plurality of phases; and
wherein said molded portion is formed on said core for each phase.

17. The electric pump of claim 12, wherein
channels are provided on said molded portion.

18. The electric pump of claim 17, wherein
said channels are formed radially.

19. The electric pump of claim 17, wherein
said stator cores are formed to include a plurality of phases, wherein
said molded portion is formed on said core for each phase, and wherein
a channel is provided between said phases.

20. The electric pump of claim 17, wherein
said channel is formed at the center of said magnetic pole.

21. The electric pump of claim 1, wherein said stator core is divided into two side portions.

22. The electric pump of claim 1, wherein said stator core is a compressed powder core.

23. The electric pump of claim 1, wherein an opening defined by the claw part and the claw base is a large opening.

* * * * *